United States Patent [19]

Takano

[11] Patent Number: 5,458,224
[45] Date of Patent: Oct. 17, 1995

[54] CLUTCH RELEASE-ACTUATING HYDRAULIC CYLINDER FLUID CHAMBER CONSTRUCTION

[75] Inventor: Tetsuji Takano, Osaka, Japan

[73] Assignee: Kabushiki Kaisha Daikin Seisakusho, Osaka, Japan

[21] Appl. No.: 123,395

[22] Filed: Sep. 17, 1993

[30] Foreign Application Priority Data

Sep. 18, 1992 [JP] Japan ............................. 4-065175 JU

[51] Int. Cl.$^6$ ............................ F16D 25/08; F16D 23/14
[52] U.S. Cl. .................................. 192/85 CA; 92/171.1; 192/91 A; 192/98
[58] Field of Search .................... 192/85 CA, 91 A, 192/98; 92/170.1, 171.1, 223; 427/306

[56] References Cited

U.S. PATENT DOCUMENTS

| 1,605,838 | 11/1926 | Hawley, Jr. | 92/223 |
| 3,911,891 | 10/1975 | Dowell | 92/223 X |
| 4,456,111 | 6/1984 | Limbacher | 192/85 CA |
| 4,495,772 | 1/1985 | Furuta et al. | 92/171.1 X |
| 4,601,374 | 7/1986 | Ladin | 192/85 CA |
| 4,682,669 | 7/1987 | Weber | 92/171.1 X |
| 4,708,228 | 11/1987 | Leigh-Monstevens | 192/85 CA |
| 4,971,846 | 11/1990 | Lundy | 92/171.1 X |
| 4,979,602 | 12/1990 | Fukushima | 192/91 A X |
| 4,993,529 | 2/1991 | Leigh-Monstevens et al. | 192/91 A X |
| 5,158,052 | 10/1992 | Yoshimura | 92/223 X |
| 5,230,928 | 7/1993 | Takagi et al. | 427/306 X |
| 5,307,915 | 5/1994 | Grosspietsch et al. | 192/85 CA X |

FOREIGN PATENT DOCUMENTS 376117  7/1932  United Kingdom ..................... 92/223

Primary Examiner—Andrea L. Pitts
Attorney, Agent, or Firm—Knobbe, Martens, Olson & Bear

[57] ABSTRACT

Construction in order to improve wear-resistance of a hydraulic fluid chamber in which a clutch release-actuating tubular piston is operative within a cylindrical housing made of a resin-based material reinforced with glass fiber, the piston axially driving a clutch release bearing to force a clutch diaphragm spring to release the clutch of a motor vehicle power train. A sealing member is provided on tile piston for sealing piston-driving hydraulic fluid within the fluid chamber. The cylindrical housing is double-walled, defining the axially extending tubular fluid chamber. A layer of nickel is electroless-plated at least along the fluid chamber bore where the sealing member slides; alternatively stainless steel linings are installed along the corresponding portions of the chamber bore. The plated layer or linings on the fluid chamber improve wear resistance of tile cylindrical housing and make the sealing member less susceptible to damage, lengthening the life of the hydraulic cylinder apparatus composed by the cylindrical housing and associated elements.

20 Claims, 3 Drawing Sheets

CLUTCH RELEASE-ACTUATING HYDRAULIC CYLINDER FLUID CHAMBER CONSTRUCTION

BACKGROUND OF THE INVENTION

The present invention relates generally to clutch release-actuating hydraulic apparatus, and more particularly, to construction in order to improve wear-resistance of a hydraulic fluid chamber within a cylindrical housing of the hydraulic apparatus, in which a piston is operative in actuating clutch release.

In clutch release actuation, it is known to drive the clutch diaphragm spring to release the clutch utilizing hydraulic pressure via hydraulic release-actuating apparatus. One type of clutch release-actuating hydraulic apparatus consists chiefly of a cylindrical housing containing a piston which axially drives a clutch release bearing that is in contact or connection with the radially inward margin of the diaphragm spring.

The cylindrical housing is disposed encircling the transmission shaft of a motor vehicle power train. Double-walled, it thus defines a tubular fluid chamber which extends axially and is open-ended toward the clutch. The cylindrical housing fluid chamber contains an axially movable tubular piston, and a sealing member is provided on the piston for sealing piston-driving hydraulic fluid within the fluid chamber. In current practice, in order to reduce weight and decrease production cost, the cylindrical housing is made of a resin-based material reinforced with glass fiber.

During operation of the hydraulic clutch release-actuating apparatus, the piston is driven under hydraulic pressure on the piston sealing member to slide axially in the tubular fluid chamber. The sealing member as fit against the bore of the fluid chamber will In the course of operation subject the resin-based cylindrical housing to wear. Consequently, glass fiber in the resin may in some cases become exposed along the fluid chamber bore surface, damaging the sealing member. Sealing member damage thus leads to hydraulic fluid leakage, decreasing the life of the hydraulic clutch release-actuating apparatus.

SUMMARY OF THE INVENTION

An object of the present invention is to improve the tubular fluid chamber wear resistance through the construction of the cylindrical housing, in order to lengthen the life of the clutch release-actuating hydraulic apparatus.

A clutch release-actuating hydraulic apparatus according to an aspect of the present invention, comprising a cylindrical housing, a tubular piston, and a sealing member, drives a clutch release bearing encircling a transmission shaft of a motor vehicle power train to release a clutch via the clutch diaphragm spring.

The cylindrical housing is double-walled and defines an axially extending tubular fluid chamber which opens toward the clutch wherein the housing is in place around the transmission shaft. The axially sliding tubular piston contacts the clutch release bearing; and It is fitted in the fluid chamber with the sealing member, provided for sealing in piston-driving hydraulic fluid. A plated layer is formed on a portion of the fluid chamber along which the sealing member slides.

Hydraulic pressure supplied into the fluid chamber of the cylindrical housing of the clutch release-actuating hydraulic apparatus forces on the sealing member, which slides along the fluid chamber bore as the tubular piston is driven to slide axially, in turn driving the release bearing to release the clutch. The plated layer formed on the portion of the fluid chamber where the sealing member slides therein improves fluid chamber wear resistance. Therefore, the cylindrical housing is less susceptible to wear and the sealing member is less susceptible to damage, lengthening the life of the hydraulic apparatus.

A clutch release-actuating hydraulic apparatus according to another aspect of the present invention, comprising a cylindrical housing, a tubular piston, a sealing member, and a liner lining a fluid chamber of the cylindrical housing, drives a clutch release bearing encircling a transmission shaft of a motor vehicle power train to release a clutch via the clutch diaphragm spring.

The cylindrical housing is double-walled and defines an axially extending tubular fluid chamber which opens toward the clutch wherein the housing is in place around the transmission shaft. The axially sliding tubular piston contacts the clutch release bearing; and it is fitted in the fluid chamber with the sealing member, provided for sealing in piston-driving hydraulic fluid. The fluid chamber liner is formed on a portion of the fluid chamber along which the sealing member slides.

Hydraulic pressure supplied into the fluid chamber of the cylindrical housing of the hydraulic apparatus in this embodiment forces on the sealing member, which slides along the fluid chamber bore as the tubular piston is driven to slide axially, turn driving the release bearing to release the clutch. The liner, disposed on the portion of the fluid chamber where the sealing member slides, therein improves fluid chamber wear resistance. Therefore, the cylindrical housing is less susceptible to wear and the sealing member is less susceptible to damage, lengthening the life of the hydraulic apparatus.

The foregoing and other objects aspects and advantages of the present invention will become more apparent from the following detailed description.

DESCRIPTION OF THE PREFERRED EMBODIMENTS

First Embodiment

Figure 1:
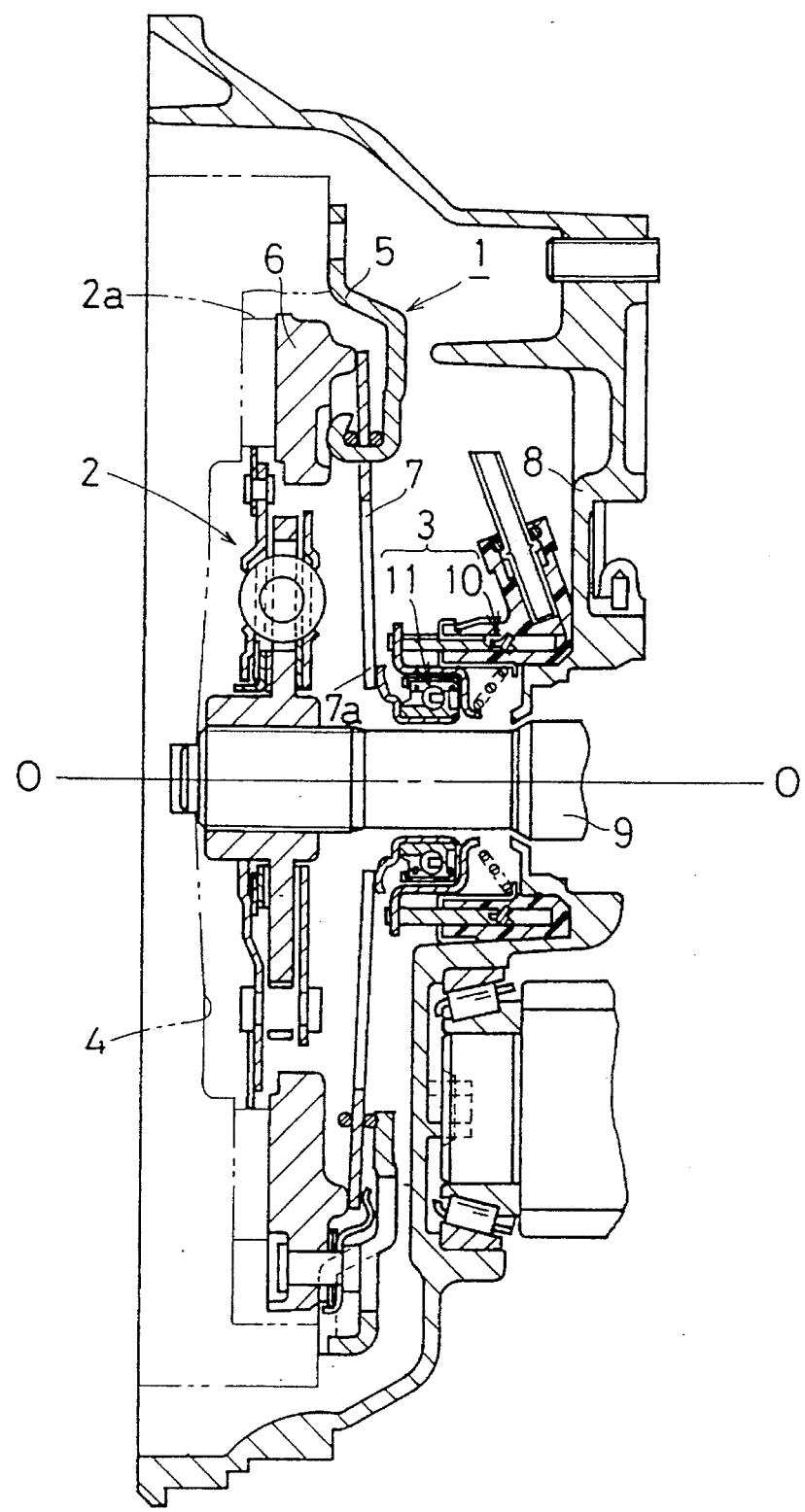
FIG. 1 is a longitudinal sectional view illustrating a clutch employing a first embodiment of the present invention.

FIG. 1 illustrates a clutch employing one embodiment of the present invention, wherein the line 0—0 represents the rotational axis of the clutch.

in FIG. 1, the clutch is shown to be mainly composed of a clutch cover assembly 1, a clutch disk 2, and a hydraulic-type clutch release-actuating apparatus 3.

The clutch cover assembly 1 comprises a clutch cover 5 fixed to a flywheel 4 attached to an engine output shaft (not shown), a pressure plate 6 disposed inside the clutch cover 5, and a diaphragm spring 7. The radially middle portion of the diaphragm spring 7 is supported by the clutch cover 5, while the peripheral margin thereof adjacent the pressure plate 6 elastically presses it against the clutch disk 2. Therein, a friction facing 2a of the clutch disk 2 is interposed between the flywheel 4 and the pressure plate 6. From its midsection to its radially inward rim the diaphragm spring 7 is silt radially into release fingers. The radially inward margin 7a of the diaphragm spring 7 is connected to the hydraulic release-actuating apparatus 3.

A main drive shaft 9 extending from the transmission side (the right side of FIG. 1) is spline-fitted into the center of the clutch disk 2.

Figure 2:
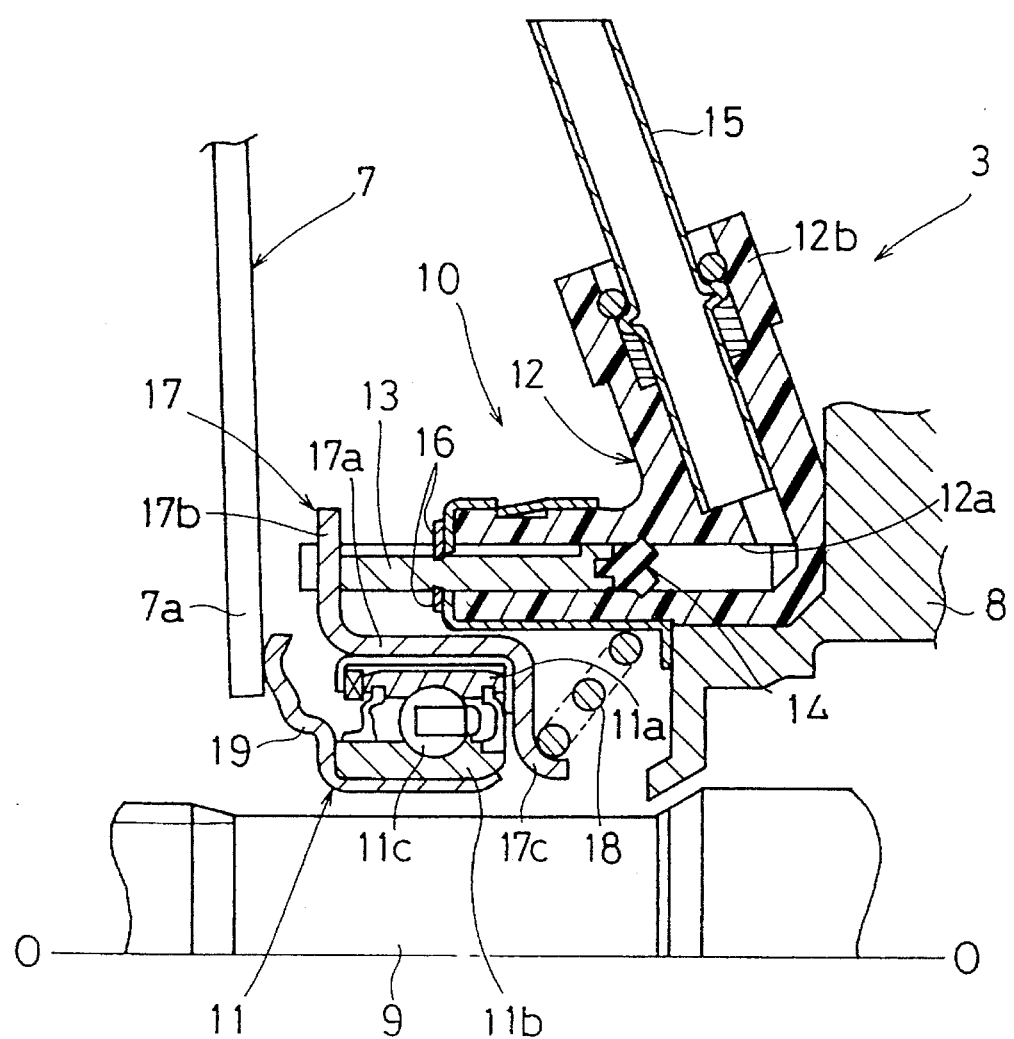
FIG. 2 is a magnified partial view corresponding to FIG. 1 showing details of the hydraulic cylinder device of the first embodiment.

The hydraulic release-actuating apparatus 3 will be described in detail with reference to FIG. 2.

The hydraulic release-actuating device 3 is mainly composed of a hydraulic cylinder device 10 and a release bearing 11. The hydraulic cylinder device 10, essentially a slave cylinder, is supplied operative hydraulic pressure from a master cylinder (not shown). The master cylinder is operated by the operation of a clutch pedal.

The hydraulic cylinder device 10 comprises a cylindrical housing 12 made of a resin-based material, a tubular piston 13 also made of a resin-based material, and a sealing member 14.

The cylindrical housing 12 is fixed to a transmission housing 8 mounted behind the clutch cover 1 and is disposed coaxially with the rotational axis 0—0 of the clutch. The cylindrical housing 12 is provided with a tubular fluid chamber 12a extending axially and opening toward the clutch disk 2. The entire surface of the cylindrical housing 12 is electrolessly plated with nickel, such that the bore surface of the fluid chamber 12a is also plated with nickel. In addition, projecting from the cylindrical housing 12 on the transmission housing 8 side are two fittings 12b (only one fitting is illustrated in FIG. 2). Each fitting 12b projects obliquely, inclining radially outwardly toward the clutch disk 2. A hydraulic supply pipe 15 supplying hydraulic pressure from the master cylinder and an air vent pipe (not shown) are connected to each of the two fittings 12b respectively.

The tubular piston 13 is fitted in the fluid chamber 12a of the cylindrical housing 12, the end toward the clutch disk 2 projecting from the fluid chamber 12a. The sealing member 14 is annular and is attached to the end of the tubular piston 13 contained in the fluid chamber 12a. The sealing member 14 prevents hydraulic fluid supplied to the fluid chamber 12a from leaking to the exterior. A dust seal 16, For preventing dust from entering the fluid chamber 12a from the outside, is affixed to the end of the cylindrical housing 12 which is on the clutch disk 2 side.

A release bearing 11 is disposed encircling the main drive shaft 9, and comprises an outer race 11a, an inner race 11b, and a plurality of roller elements 11c carried in between the races. An annular connector 17 is fixed to the periphery of the outer race 11a. The annular connector 17 comprises a cylindrical support 17a which abuts on the peripheral wall of the outer race 11a, a flange 17b extending radially outward from the cylindrical support 17a on the clutch disk 2 side thereof, and a lip 17c extending radially inward from the cylindrical support 17a on the transmission side. The projecting end of the tubular piston 13 is fixed to the flange 17b, whereby the annular connector 17 and the release bearing 11 move axially, conjointly with the tubular piston 13. In addition, an actuating crown 19 is fixed to the inner race 11b of the release bearing 11. A portion of the actuating crown 19 on the clutch disk 2 side is flanged radially outward, and abuts on the radially inward margin 7a of the diaphragm spring 7.

A conical coil spring 18 is disposed between the lip 17c of the annular connector 17 and the transmission housing 8. The conical coil spring 18 always presses the release bearing 11 against the diaphragm spring 7 at a low load. As the friction facing 2a of the clutch disk 2 wears, thereby changing the position of the release fingers of the diaphragm spring 7, the release bearing 11 is made to follow, compensating the change.

Description is now made of the operation.

The friction facing 2a of the clutch disk 2 is interposed between the pressure plate 6 and the flywheel 4, whereby engine torque on the flywheel 4 is transmitted to the clutch disk 2, in turn being transmitted to the transmission through the main drive shaft 9.

When the driver of a motor vehicle in which the apparatus is operative depresses the clutch pedal, hydraulic fluid is supplied from the master cylinder (not shown) to the fluid chamber 12a of the hydraulic cylinder device 10 through the hydraulic supply pipe 15. Consequently, the tubular piston 13 is driven toward the clutch disk 2, whereby the release bearing 11, through the annular connector 17, is driven axially. The release bearing 11 thus presses the radially inward margin of the diaphragm spring 7. As a result, the radially outer margin of the diaphragm spring 7 flexes toward the transmission, thereby releasing the pressure plate 6 from being pressed against the flywheel 4, the above-described manner, the clutch is released.

When the driver stops depressing the clutch pedal, the hydraulic pressure impelling the tubular piston 13 in the hydraulic cylinder device 10 toward the clutch disk 2 drops to zero. Thereupon, the release bearing 11 and the tubular piston 13 are urged toward the transmission 8 by the diaphragm spring 7, which thereupon engages the clutch.

During the course of releasing and engaging the clutch as described above, the tubular piston 13 slides axially back and forth in the fluid chamber 12a, meanwhile the sealing member 14 is slid along the bore surface of the fluid chamber 12a. In the present embodiment, however, the electroless nickel-plated layer being formed on the bore surface of the fluid chamber 12a, accordingly, the wear resistance of the fluid chamber 12a is improved, and wear on the bore surface thereof is reduced. In addition, the coefficient of friction along the bore surface of the fluid chamber 12a is lowered for the same reason, thereby improving the sliding characteristics between the cylindrical walls defining the fluid chamber 12a, and the sealing member 14. This enables smoother performance of the clutching operation.

Second Embodiment

Figure 3:
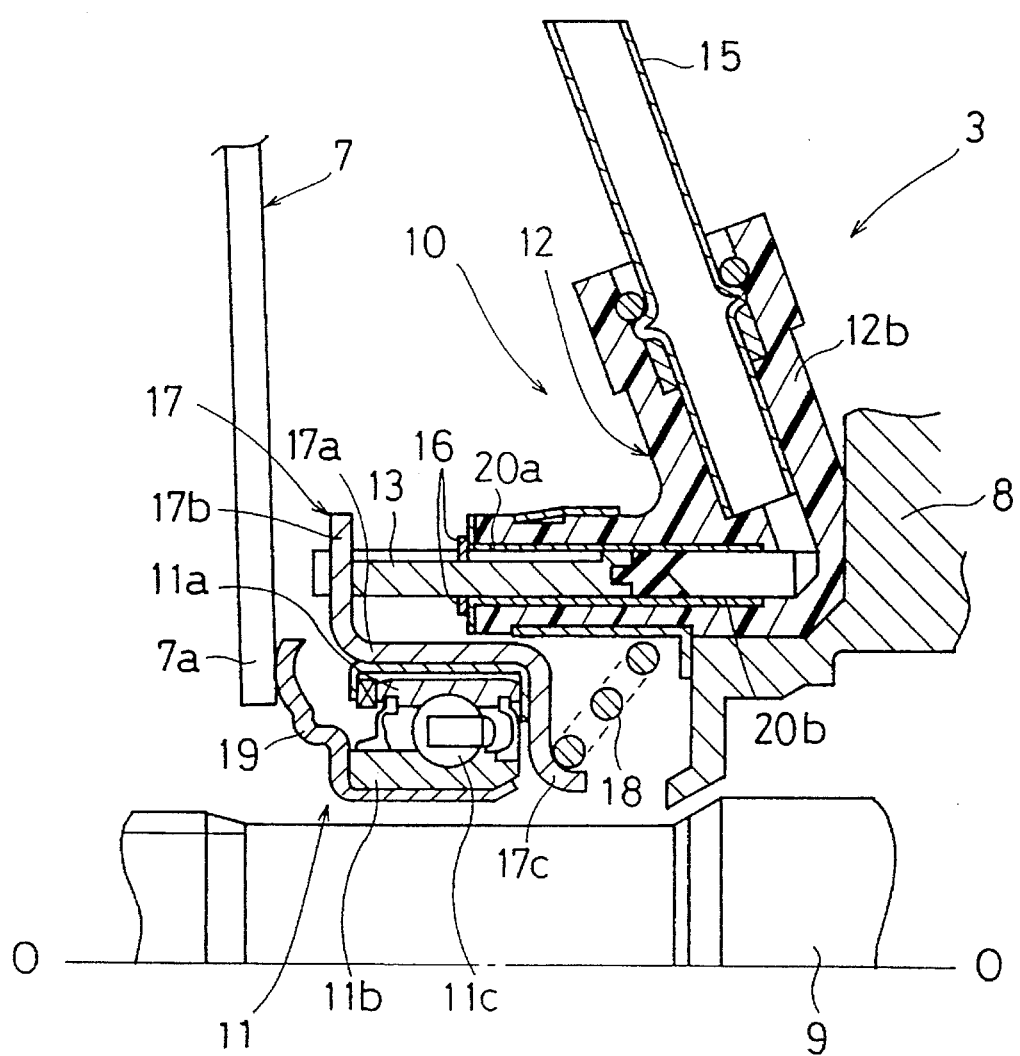
FIG. 3 is a view corresponding to FIG. 2 of a second embodiment of the present Invention.

FIG. 3 illustrates an embodiment in which a liner is disposed lining the fluid chamber 12a. In this embodiment, the basic construction is the same as that in the first embodiment and hence, the description thereof is omitted.

An outer lining 20a and an inner lining 20b are respectively fixed to radially adjacent facing surfaces along the bore of the fluid chamber 12a. Both the linings 20a and 20b are made of steel, and are formed integrally with cylindrical housing 12. When tubular piston 13 is driven to slide axially, sealing member 4 slides in contact with the outer and inner linings 20a and 20b.

The above described linings 20a and 20b inserted into the sliding-contact bore surface of the fluid chamber 12a make possible significant reduction in wear on the bore surface, even wherein the entire cylindrical housing 12 is composed of a resin-based material. In addition, variations in the cylindrically, and out-of-roundness of the bore surface along which the tubular piston 13 and the sealing member 14 slide, are decreased, also for the foregoing reason, enabling smoother performance of the clutching operation.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A clutch release-actuating hydraulic cylinder apparatus, comprising:

a clutch release bearing encircling a transmission shaft of a motor vehicle power train to release a clutch disk of a power-engaging clutch of the power train from an engine power-input rotation member;

a double-walled cylindrical housing defining a tubular fluid chamber extending in an axial bore opening toward said clutch disk wherein the cylindrical housing concentrically surrounds said transmission shaft;

an axially slidable tubular piston fitted in said fluid chamber, for connection with said clutch release bearing;

a sealing member provided on said tubular piston for sealing piston-driving hydraulic fluid in said fluid chamber; and a plated layer formed on an inner surface of a portion within said fluid chamber along which said sealing member slides, said plated layer being formed on said inner surface through an electroless plate process.

2. A clutch release-actuating hydraulic cylinder apparatus according to claim 1, wherein said plated layer is an electroless-plated nickel layer.

3. A clutch release-actuating hydraulic cylinder apparatus according to claim 2, wherein said cylindrical housing is made of a resin-based material.

4. A clutch release-actuating hydraulic cylinder apparatus according to claim 3, wherein said tubular piston in connection with said clutch release bearing projects from the axial bore of said fluid chamber; and said sealing member is attached opposite the connection with said clutch release bearing to an end of said tubular piston to which said sealing member is correspondingly annular;

said electroless-plated nickel layer being formed on said axial bore of said fluid chamber.

5. A clutch release-actuating hydraulic cylinder apparatus, comprising:

a clutch release bearing encircling a transmission shaft of a motor vehicle power train to release a clutch disk of a power-engaging clutch of the power train from an engine power-input rotation member;

a double-walled cylindrical housing defining a tubular fluid chamber extending in an axial bore opening toward said clutch disk wherein the cylindrical housing concentrically surrounds said transmission shaft;

an axially slidable tubular piston fitted in said fluid chamber and engaged with said clutch release bearing; and a sealing member provided on said tubular piston for sealing piston-driving hydraulic fluid in said fluid chamber; and a liner lining a portion of the axial bore of said fluid chamber along which said sealing member slides, wherein said clutch releasing bearing has an outer diameter smaller than an inner diameter of said cylinder housing so that the clutch releasing bearing is arranged between said cylinder housing and said transmission shaft in a radial direction.

6. A clutch release-actuating hydraulic cylinder apparatus according to claim 5, wherein said liner comprises outer and inner linings along axially facing wall surfaces of said cylindrical housing.

7. A clutch release-actuating hydraulic cylinder apparatus according to claim 6, wherein said cylindrical housing is made of a resin-based material; and said outer and inner linings are made of steel and are formed to be integral with said cylindrical housing walls.

8. A clutch release-actuating hydraulic cylinder apparatus according to claim 7, wherein:

said tubular piston in connection with said clutch release bearing projects from said axial bore of said fluid chamber; and said sealing member is attached opposite said connection with said clutch release bearing to an end of said tubular piston wherein said sealing member is correspondingly annular.

9. A clutch release-actuating hydraulic apparatus, comprising:

a clutch release bearing encircling a transmission housing of a motor vehicle power train for axially driving a clutch release lever to release a clutch disk pressed against an engine power-input rotation member; and a hydraulic cylinder device for axially driving said clutch release bearing, wherein said hydraulic cylinder device comprises:

a double-walled cylindrical housing defining a tubular fluid chamber extending in an axial bore opening toward said clutch disk wherein the cylindrical housing is mounted onto said transmission housing;

an axially slidable tubular piston fitted in said fluid chamber, for connection with said clutch release bearing;

a sealing member provided on said tubular piston for sealing piston-driving hydraulic fluid in said fluid chamber; and a plated layer formed on an inner surface of a portion within said fluid chamber along which said sealing member slides, said plated layer being formed on said surface through an electroless plate process.

10. A clutch release-actuating hydraulic apparatus according to claim 9, wherein said plated layer is an electroless-plated nickel layer.

11. A clutch release-actuating hydraulic apparatus according to claim 10, wherein said cylindrical housing is made of a resin-based material.

12. A clutch release-actuating hydraulic apparatus according to claim 11, wherein said tubular piston in connection with said clutch release bearing projects from the axial bore of said fluid chamber; and said sealing member is attached opposite the connection with said clutch release bearing to an end of said tubular piston to which said sealing member is correspondingly annular;

said electroless-plated nickel layer being formed on said axial bore of said fluid chamber.

13. A clutch release-actuating hydraulic apparatus according to claim 9, further comprising a connecting means for connecting said clutch release bearing to a radially inner endward margin of said tubular piston.

14. A clutch release-actuating hydraulic apparatus according to claim 13, wherein said connecting means comprises an axially extending cylindrical support fixedly containing said clutch release bearing;

a flange portion flaring radially outward from an end of the cylindrical support, said tubular piston being connectable to said flange portion; and a lip portion extending radially inward from an end of said cylindrical support opposite said flange portion; said clutch-releasing hydraulic device further comprising:

an elastic member disposed between said lip portion of said cylindrical support, and said transmission housing, for pressing said connecting means toward said engine power-input rotation member.

15. A clutch release-actuating hydraulic apparatus, comprising:

a clutch release bearing encircling a transmission housing of a motor vehicle power train for axially driving s clutch release lever to release a clutch disk pressed against an engine power-input rotation member; and a hydraulic cylinder device for axially driving said clutch release bearing, wherein said hydraulic cylinder device comprises:

a double-walled cylindrical housing defining a tubular fluid chamber extending in an axial bore opening toward said clutch disk wherein the cylindrical housing is mounted onto said transmission housing;

an axially slidable tubular piston fitted in said fluid chamber, for connection with said clutch release bearing; and a sealing member provided on said tubular piston for sealing piston-driving hydraulic fluid in said fluid chamber; and a liner lining a portion of the axial bore of said fluid chamber along which said sealing member slides, wherein said clutch releasing bearing has an outer diameter smaller than an inner diameter of said cylinder housing so that the clutch releasing bearing is arranged between said cylinder housing and said transmission housing in a radial direction.

16. A clutch release-actuating hydraulic apparatus according to claim 15, wherein said liner comprises outer and inner linings along axially facing wall surfaces of said cylindrical housing.

17. A clutch release-actuating hydraulic apparatus according to claim 16, wherein said cylindrical housing is made of a resin-based material; and said outer and inner linings are made of steel and are formed to be integral with said cylindrical housing walls.

18. A clutch release-actuating hydraulic apparatus according to claim 17, wherein:

said tubular piston in connection with said clutch release bearing projects from said axial bore of said fluid chamber; and said sealing member is attached opposite said connection with said clutch release bearing to an end of said tubular piston wherein said is sealing member is correspondingly annular.

19. A clutch release-actuating hydraulic apparatus according to claim 15, further comprising a connecting means for connecting said clutch release bearing to a radially inner endward margin of said tubular piston.

20. A clutch release-actuating hydraulic apparatus according to claim 19, wherein said connecting means comprises an axially extending cylindrical support fixedly containing said clutch release bearing;

a flange portion flaring radially outward from an end of the cylindrical support, said tubular piston being connectable to said flange portion; and a lip portion extending radially inward from an end of said cylindrical support opposite said flange portion; said clutch-releasing hydraulic device further comprising:

an elastic member disposed between said lip portion of said cylindrical support, and said transmission housing, for pressing said connecting means toward said engine power-input rotation member.

\* \* \* \* \*